July 30, 1968 — M. E. NEREM — 3,394,513
SANDWICH PANEL ATTACHMENT REINFORCEMENT
Filed March 14, 1966

INVENTOR.
MARVIN E. NEREM
BY Braddock & Burd
ATTORNEYS

United States Patent Office 3,394,513
Patented July 30, 1968

3,394,513
SANDWICH PANEL ATTACHMENT
REINFORCEMENT
Marvin E. Nerem, Forest City, Iowa, assignor to Winnebago Industries, Inc., Forest City, Iowa, a corporation of Iowa
Filed Mar. 14, 1966, Ser. No. 534,198
10 Claims. (Cl. 52—309)

ABSTRACT OF THE DISCLOSURE

A sandwich type construction panel having relatively thin outer layers or skins secured to opposite sides of core material. A flat reinforcing member is attached to the inside of one of the skins by bonding material. Interposed and bonded to the reinforcing member and opposite skin is core material having a greater density than the balance of the core material. A screw threaded through the skin and reinforcing member secures an angle support to the skin.

SUMMARY OF THE INVENTION

This invention relates to a sandwich construction panel having a pair of relatively thin facing sheet members bonded to and facing opposite sides of core material. A reinforcing member is located between the core material and the one sheet member. The reinforcing member has a first surface located adjacent an inner surface of the one sheet member and a second surface spaced from the other sheet member. Core material is located between the reinforcing member and the other sheet member. The reinforcing member is bonded to the inner face of the sheet member and core material to provide a rigid support for a fastening means projected through the one sheet member into the reinforcing means. The drawings accompanying this application are briefly described as follows:

Figure 2:
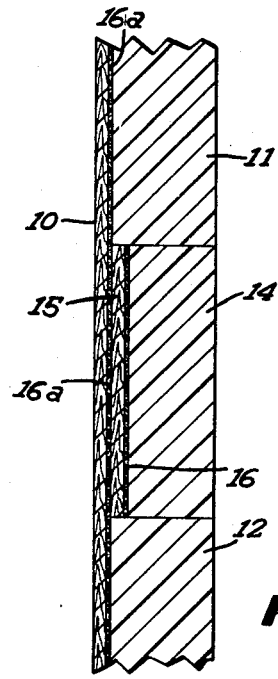
FIGURE 2 is drawn to the same scale as FIGURE 1 and shows the element of FIGURE 1 in an assembled condition but with the second panel facing not yet secured.
Figure 3:
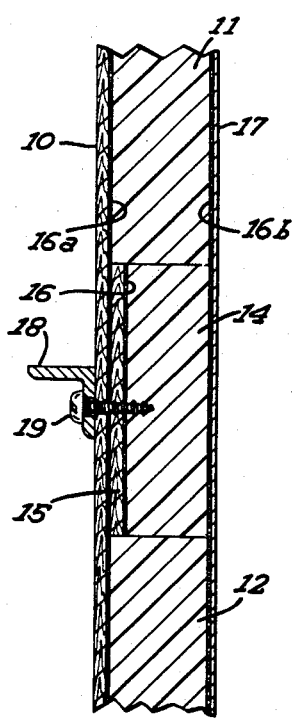
Figure 4:
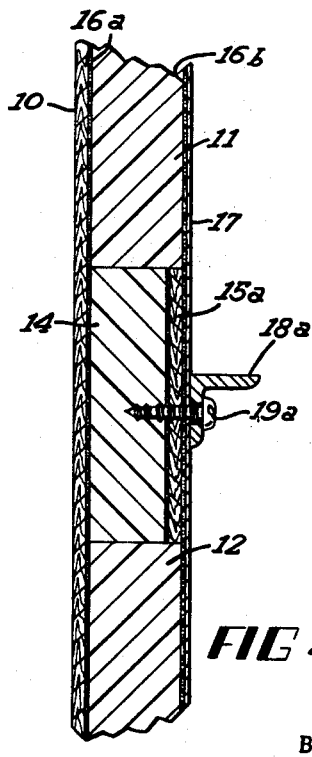

FIGURE 3 is similar to FIGURE 2 except that a panel facing is shown bonded to the opposite side of the core and an attachment is shown secured to the reinforcing; and FIGURE 4 is similar to FIGURE 3 except that the portion of sandwich panel core which has the reinforcing unit secured to it has been reversed and the reinforcing permits attachment of an accessory to the opposite side of the sandwich panel from that shown in FIGURE 3.

Figure 1:
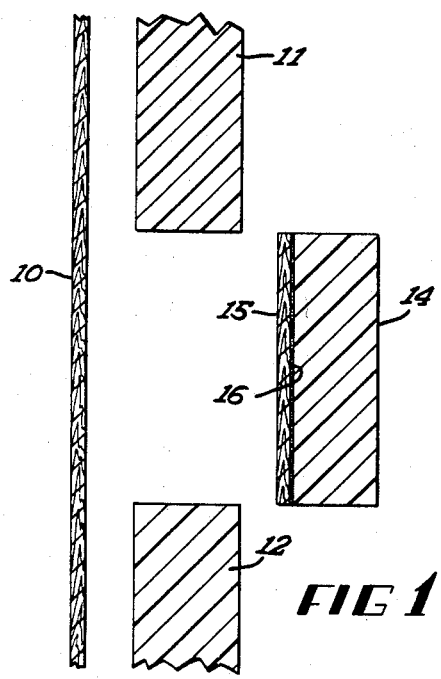
FIGURE 1 is an exploded fragmentary sectional view of one sandwich panel including a reinforcing member secured to a portion of the core material.

Referring again to the drawings, this time to give a detailed description of the invention, there is seen any suitable sandwich panel facing material 10 here shown by example as a piece of plywood and a suitable sandwich panel filler or core material such as the portions 11, 12 and 14 of an expanded foam material such as polystyrene or similar type of material, such as, but not limited to, paper or metal honeycomb, foamed polyurethane, plywood, fibrous boards and other materials used as sandwich panel cores. As shown in FIGURE 1 a reinforcing member which may be similar to the material 10 is shown at 15 bonded to the core material portion 14. The reinforcing member 15 may be bonded by the bonding material 16 to the core material 14 before all of these units are assembled into a panel as shown in FIGURE 2. Here bonding material which may be identical to that identified at 16 in FIGURE 1 and hence identified as 16a is used to bond all of the core materials, the reinforcing and the sheet member 10 into a single panel. The bonding material 16a may, however, be different from bonding material 16. It will be seen that the core material portion 14 is less thick than the members 11 and 12 by the thickness of the reinforcing member 15. This may be accomplished in a number of ways, but when a reinforcing member of a character shown here is used it may be achieved conveniently by flattening or compressing the core material portion 14 a sufficient amount.

In FIGURE 3 is seen the panel facing 10 and all of its core material that was bonded to it in FIGURE 2 now enclosed by a further sandwich panel facing member 17 secured to the opposite side by a bonding material that may be the same as 16 but identified as 16b to distinguish it as to location. Here again bonding material 16b may be different than bonding materials 16 and/or 16a. The member 14 may be cut sufficiently to allow the reinforcing member 15 to be secured to it and still have the portion of the total sandwich panel core that is engaged by sandwich panel facing 17 be flat. Portion 14 may be formed thinner initially in the production. When the relatively thin reinforcing member shown in all the figures by way of example is used, however, it is possible to have all one thickness of core and reduce the thickness of the portion 14 by simply passing it through rollers or otherwise compressing it. This may be accomplished at the same time that the member 15 is secured to the member 14, in which case portions 11, 12 and 14 may be integral, or it may be done separately.

The outside facings of the sandwich panel may, of course, be any material or materials suitable for sandwich panel construction. As here shown the sandwich panel facing 10 is a relatively thin plywood and the sandwich panel facing 17 is a relatively thin aluminum sheet. This type of sandwich panel construction is extremely satisfactory for, but not limited to, the walls of house trailers, pick-up coaches, tent campers, motorized homes and similar mobile structure contended. It is also useful for other purposes such as building construction, interior partitions, doors and the like.

It is entirely possible that all of the elements in the reinforced sandwich type construction shown in FIGURE 3 can be bonded together simultaneously. For example, the sandwich panel facing 10 could be coated with the adhesive 16a and the core member reinforcing member 15 located thereon as desired. At this point, the adhesive material 16 could be applied and then all of the core members 11, 12 and 14 could be placed into position on the board 10 and reinforcing 15 as one integral piece or as two or more pieces, three pieces shown here for purposes of illustration. Thereafter adhesive materials 16b could be applied and the entire structure placed under compression at one time in order to achieve bonding. This compression could be adequate to compress member 14 sufficiently to compensate for the presence for the reinforcing member 15 if a single core material thickness is more desirable than having separate thicknesses for different jobs.

When the sandwich panel is assembled as shown in FIGURE 3 any attachment such as the support member 18 may be secured as shown at 19 to the outside of the sandwich and the fastener 19 will find sufficient support to form a durable attachment for the support 18 on the sandwich wall. The fastener 19 may be a screw as shown for illustration purposes or other suitable device such as, but not limited to, rivets, staples, nails, etc. Support 18 may represent a ledge supporting a bunk bed, for example, or shelves, cabinetry or an abutting panel. In FIGURE 4 the structure is or may be very similar to that shown in FIGURE 3 with the exception of the reversed position of the reinforcing member 15 and here identified as 15a simply to distinguish it from the structure shown in FIGURE 3. The support member is identified as 18a and fastened by 19a. FIGURE 4 may be thought of as illustrating an exemplary device secured to the outside of a house trailer as, for example, a canopy railing or a door stop or the like. Incorporation of a reinforcing member is not limited to location of the reinforcing member behind only one or the other of the two facings because, in fact, reinforcing members can be located behind both facings. The reinforcing members can be opposite one another, staggered with respect to one another, placed in parallel to one another or in different directions to one another. If parallel and opposite, they may share member 14 in common.

While the reinforcing has here been shown as a piece of plywood, it could be any reinforcing material that is adequate as reinforcing and can be inserted into the sandwich panel construction in the manner shown here with the plywood. Materials that are used as the surfaces for the sandwich panel may also be any of the many varieties of material that are produced in sheet form such as, without being limited to, steel, aluminum, plywood, hardboard and Fiberglas-reinforced plastic.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A construction panel of sandwich type comprising: core material having opposite sides, a pair of relatively thin facing sheet members bonded to and facing the opposite sides of the core material a reinforcing member between some of said core material and one sheet member, said reinforcing member having a first surface located adjacent an inner face of one sheet member and a second surface spaced from the other sheet member located adjacent core material, bonding material interposed between said first surface and the inner face of the one sheet member and between said second surface and the adjacent core material to secure the reinforcing member to the one sheet member and core material to provide a support for a fastening means projected through the one sheet member into the reinforcing member whereby a device may be securely attached to said one facing sheet member of said panel with the fastening means.

2. The panel of claim 1 in which the core material adjacent said reinforcing is of greater density than the balance of said core material.

3. The panel of claim 1 in which said sandwich facing sheet members are of different thickness and at least a reinforcing member enclosed in said panel nearer the thicker facing sheet member.

4. The panel of claim 1 in which said sandwich facing sheet members are of different thickness and at least a reinforcing member enclosed in said panel nearer the thinner facing sheet member.

5. The panel of claim 1 in which said core material is foamed plastic and that portion adjacent said reinforcing member has been compressed partially.

6. The panel of claim 1 in which one of said sandwich panel facing members is metallic and the other is fiberous and a reinforcing member is adjacent said fiberous facing.

7. The panel of claim 1 in which one of said sandwich facing sheet members is fiberous and the other is metallic and a reinforcing member is adjacent said metallic sandwich facing sheet member.

8. The panel of claim 1 wherein the first surface of the reinforcing member is substantially flat.

9. The panel of claim 1 wherein the first surface and the second surface of the reinforcing member are substantially flat.

10. The panel of claim 1 in combination with a support positioned adjacent the outside face of the one sheet member and fastening means projected through the support, the one sheet member, and the reinforcing member to secure the support to the one sheet member.

References Cited
UNITED STATES PATENTS

| | | | |
|---|---|---|---|
| 1,486,113 | 3/1924 | Baxter et al. | 52—622 X |
| 2,020,845 | 11/1935 | Marshall | 52—622 X |
| 2,070,479 | 2/1937 | Foster | 52—602 X |
| 3,003,810 | 10/1961 | Kloote et al. | 52—613 X |
| 3,121,264 | 2/1964 | Hammar | 52—622 X |
| 3,159,882 | 12/1964 | Slayter | 52—573 X |
| 3,226,899 | 1/1966 | Blickle | 52—622 X |
| 3,305,986 | 2/1967 | Mathews | 52—309 X |
| 3,332,170 | 7/1967 | Bangs | 52—309 X |
| 3,362,120 | 1/1968 | Warren | 52—366 X |

DAVID J. WILLIAMOWSKY, *Primary Examiner.*

DENNIS L. TAYLOR, *Assistant Examiner.*